United States Patent [19]
Murray

[11] Patent Number: 5,615,868
[45] Date of Patent: Apr. 1, 1997

[54] ACTIVE PNEUMATIC MOUNT

[75] Inventor: Bruce S. Murray, Winchester, Mass.

[73] Assignee: Bolt Beranek and Newman Inc., Cambridge, Mass.

[21] Appl. No.: 538,904

[22] Filed: Oct. 4, 1995

[51] Int. Cl.$^6$ ........................................ F16F 9/04
[52] U.S. Cl. ..................... 267/64.27; 267/140.14; 248/638
[58] Field of Search ............... 267/64.11, 64.15, 267/64.23, 64.24, 64.27, 136, 140.14, 140.15, 153; 188/267, 299; 180/300, 312; 248/550, 566, 636, 638; 381/71; 318/114

[56] References Cited

U.S. PATENT DOCUMENTS

| | | |
|---|---|---|
| 2,964,272 | 12/1960 | Olson . |
| 3,189,303 | 6/1965 | Boothe . |
| 3,216,679 | 11/1965 | Curwen . |
| 3,582,027 | 6/1971 | Hackbarth et al. . |
| 3,589,655 | 6/1971 | Hackbarth et al. . |
| 3,606,233 | 9/1971 | Scharton et al. . |
| 3,635,427 | 1/1972 | Balke . |
| 3,667,707 | 6/1972 | Mui . |
| 3,701,499 | 10/1972 | Schubert et al. . |
| 4,122,303 | 10/1978 | Chaplin et al. . |
| 4,153,815 | 5/1979 | Chaplin et al. . |
| 4,417,098 | 11/1983 | Chaplin et al. . |
| 4,429,496 | 2/1984 | Masri . |
| 4,483,424 | 11/1984 | Kelemen . |
| 4,489,441 | 12/1984 | Chaplin . |
| 4,490,841 | 12/1984 | Chaplin et al. . |
| 4,600,863 | 7/1986 | Chaplin et al. . |
| 4,603,843 | 8/1986 | Bechu . |
| 4,638,983 | 1/1987 | Idigkeit et al. ............. 267/152 X |
| 4,756,513 | 7/1988 | Carlson et al. . |
| 4,798,369 | 1/1989 | Geno et al. ............. 267/64.27 X |
| 4,869,477 | 9/1989 | Hoying et al. . |
| 5,044,455 | 9/1991 | Tecco et al. . |
| 5,052,510 | 10/1991 | Gossman . |
| 5,127,622 | 7/1992 | Whelpley et al. . |
| 5,231,583 | 7/1993 | Lizell . |
| 5,273,262 | 12/1993 | Baldini et al. . |
| 5,285,995 | 2/1994 | Gonzalez et al. . |
| 5,356,123 | 10/1994 | Hamada et al. ............. 267/140.14 |
| 5,374,025 | 12/1994 | Whelpley et al. . |
| 5,388,812 | 2/1995 | Kojima et al. ............. 267/140.14 |
| 5,413,316 | 5/1995 | Easter ............. 267/64.27 X |
| 5,439,204 | 8/1995 | Yamazoe et al. ............. 267/140.14 |
| 5,551,650 | 9/1996 | Southward et al. ............. 267/140.15 X |

FOREIGN PATENT DOCUMENTS

| | | |
|---|---|---|
| 54-6292 | 1/1979 | Japan . |
| 2130651 | 11/1983 | United Kingdom . |

*Primary Examiner*—Lee W. Young
*Attorney, Agent, or Firm*—Henry D. Pahl, Jr.

[57] ABSTRACT

In the active pneumatic mount disclosed herein, a bellows or other flexible sealing means is utilized for containing a volume of pressurized gas which supports the weight of the equipment which is to be isolated. Within the pressurized volume is a means defining a chamber having an opening for receiving an acoustic transducer. An acoustic transducer is mounted in that opening for generating, in the pressurized volume, oscillatory pressure variations which reduce dynamic pressure variations induced by the vibrations which are to be blocked. The space within the chamber is vented to the pressurized volume, thereby to equalize the static pressure in the space.

11 Claims, 1 Drawing Sheet

ACTIVE PNEUMATIC MOUNT

BACKGROUND OF THE INVENTION

The present invention relates to vibration isolation mounts and more particularly to an active pneumatic mount which can be energized by a controller to reduce, over a preselected band of frequencies, the vibratory force transmitted through the mount, while the mount supports a static load.

As is understood, there is increasing interest in controlling or reducing noise and vibration by active means, i.e., feedback controllers which energize a transducer so as to generate a cancelling noise or vibration. Such controllers typically utilize adaptive filters which are implemented digitally. The practicality and cost effectiveness of such controllers has been advanced by the availability of digital signal processors whose capabilities have advanced in correspondence with the advances in microelectronics generally.

While various active vibration isolation mounts have been proposed in the prior art e.g., U.S. Pat. Nos. 3,606,233, 4,600,863, and 5,052,510, such mounts have not been widely adopted due to their high cost and cumbersome nature. By and large, the problems confronted are associated with the sensing and driving transducers which are necessary to implement a practical active vibration or noise control system.

Among the several objects of the present invention may be noted that the provision of a novel pneumatic vibration isolation mount; the provision of such a mount which is active and can be energized to effectively reduce the vibratory force transmitted through the mount over a pre-selectable band of frequencies; the provision of such a mount which will support a substantial static load; the provision of such a mount which is easily fabricated; the provision of such a mount which is highly reliable and which is of relatively simple and inexpensive construction. Other objects and features will be in part apparent and in part pointed out hereinafter.

SUMMARY OF THE INVENTION

The pneumatic mount of the present invention is operable to isolate vibrations produced by machinery or other equipment from a foundation supporting that machinery or to isolate sensitive equipment from ambient vibrations which might otherwise be transmitted from the foundation to the equipment. First and second mounting plates are provided for connection to the machinery and the foundation respectively and a flexible sealing means, such as a bellows, connects the peripheries of the first and second plates thereby to contain a volume of pressurized gas for supporting the weight of the equipment. Within the pressurized volume is provided a chamber having an opening for receiving an acoustic transducer. An acoustic transducer mounted in that opening can generate oscillatory pressure variations in the pressurized volume between the plates for cancelling the pressure variations induced by vibrations of the machinery. The space within the chamber is vented to the volume, thereby to equalize the static pressure in that space with that acting on the plates.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
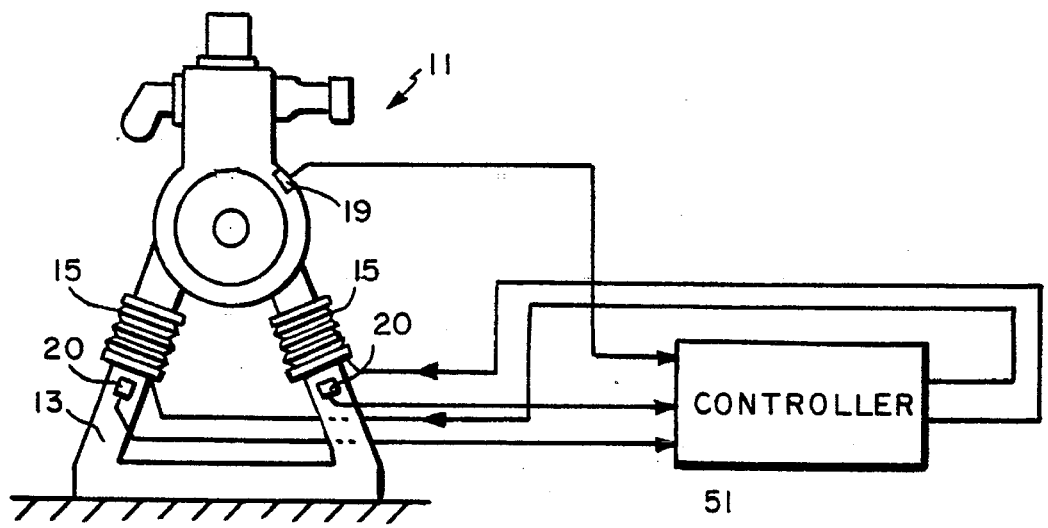
FIG. 1 is a diagram illustrating a diesel engine provided with active vibration isolating mounts in accordance with the present invention.

Referring now to FIG. 1, a diesel engine 11 is mounted on a bed or foundation 13 through a series, typically four, of active vibration isolation mounts 15 constructed in accordance with the present invention. It is an advantage of the mounts of the present invention that they may be substituted relatively easily for the more usual rubber or passive pneumatic amounts which are typically employed for mounting a vibration producing piece of machinery, such as a diesel engine. The mounts 15 are energized, as described in greater detail hereinafter, by a controller designated generally by reference character 51.

Associated with the engine 11 is a tachometer sensor or other rate sensitive pickup 19 for generating a reference signal which represents the basic or fundamental frequency of operation of the machinery. As is understood by those skilled in the art, most of the vibrational energy generated by the machinery will be harmonically related to the fundamental frequency and providing such a reference signal facilitates the implementation of an active controller. Associated with each one of the foundation mounting points is an accelerometer 20, force gauge or other transducer for sensing residual vibrations transmitted through the mounts to the foundation. An alternate way of generating a feedback signal is to directly sense pressure within the volume 30.

Figure 2:
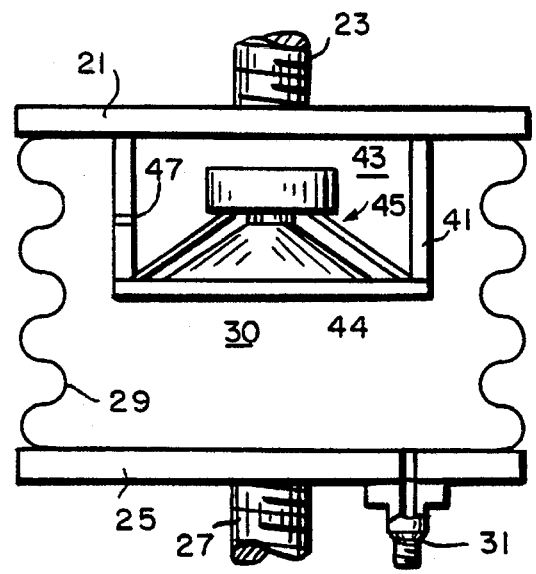
FIG. 2 is a diagram of one of the mounts employed in the arrangement of FIG. 1.

Referring now to FIG. 2, a first mounting plate 21 is provided for attachment to the vibration producing machinery, i.e. the diesel engine 11, by means of a threaded mounting stud 23. A second, similar mounting plate 25 is provided for connection to the foundation 13 by means of a threaded stud 27.

A flexible seal e.g., preferably in the form of a reinforced rubber bellows 29 as illustrated, connects the peripheries of the first and second plates thereby to contain a volume (30) of air or other pressurized gas between the plates for supporting the weight of the machinery. A suitable valve stem for introducing such pressurized gas is indicated by reference character 31. As will be understood by those skilled in the art, the sealing means may be also implemented in the form of a closed bladder to avoid the need for sealing to the mounting plates. A rolling bellows seal might also be used.

Within the pressurized volume, a housing 41 provides a rigid chamber 43 which has an opening 44 for receiving an acoustic transducer, e.g. an electromagnetic loudspeaker 45 in the preferred embodiment illustrated. The space within the chamber is vented, e.g. through a small opening 47 in the housing 41, thereby to equalize the static pressure in the chamber space 43 with that in the volume 30 acting on the mounting plates 21 and 25. The small opening 47, in concert with the chamber spaces 43 and 30 acts as a high pass filter which determines the low frequency limit for vibration compensation. The speaker is, however, able to generate oscillatory pressure variations in the space 30 over a band of frequencies corresponding with the frequencies of the vibrations which are to be cancelled. In the case of typical rotating machinery, such as diesel engine 11, the controller 51 can provide significant vibration reducing feedback over a substantial range of frequencies, e.g. from 200 Hz to over 2000 Hz. Since the operation of the loudspeaker generates some inertial forces as well as pressure variation, it is preferred that the loudspeaker end of the mount be placed on the side which is the source of the vibration, i.e. the diesel engine in the embodiment of FIG. 1.

Since the pressurized air space 30 itself is inherently fairly compliant, each mount 15 can also function to a substantial extent as a passive vibration isolation mount for vibratory frequencies outside the operating frequency band of the controller. Further, the pressurized volume 30 supports the static weight of the machinery as noted previously, i.e. the d.c. component in the electrical analogy.

The a.c. voltages generated by the accelerometers 20 are applied as input signals to an adaptive controller 51. Controller 51 may, for example, be of the general type characterized as a feedback controller which, within a preselectable band frequencies, energizes the loudspeaker 45 so as to reduce the vibratory forces transmitted through the mount. In other words, the controller adjusts the energization of the loudspeaker 45 so as to minimize the residual vibrations sensed by the accelerometers 20. In one sense, the operation of the controller may be understood to the effect an activation of the mount which dynamically increases its compliance within the frequency band of operation so that vibratory forces transmitted through the mount are effectively reduced by the loop gain of the controller.

While a separate control loop could be provided for each of the several mounts 15, it is generally preferable that a so called multiple input multiple output (MIMO) controller be utilized which takes into account and adjusts for the cross-coupling between the several mounts. Likewise, while a pure feedback controller may be utilized, it may also be advantageous in many situations to implement a so-called feed-forward control system which utilizes, as an input, a timing signal derived from the machinery creating the vibration, e.g. from the tachometer 20. In such a case, the sensing signals obtained from the accelerometers 20 again operate as error signals, providing feedback, but in a feed-forward context. The tachometer signal can also be used to determine the operating frequency of a narrow band tunable filter in a feedback controller. As indicated previously, controllers of these various types, digitally implemented, are known in the art.

Figure 3:
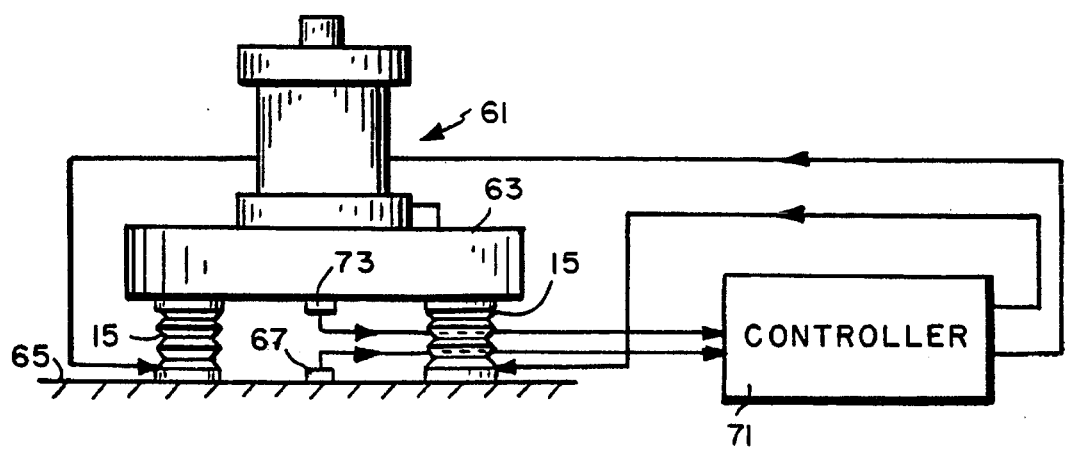
FIG. 3 is a diagram illustrating the use of mounts in accordance with the present invention isolating a piece of equipment from ambient vibrations.

Particularly in the manufacture of microelectric semiconductor components, it is sometimes necessary to isolate a sensitive piece of equipment from ambient vibrations, i.e. vibrations which might be transmitted from the foundation to the equipment. FIG. 3 illustrates the use of mounts 15 of the present invention in such an application. A sensitive piece of equipment 61, such as a step and repeat camera, is mounted on a massive inertial base 63. The base 63 is in turn supported above a foundation 65 by a plurality of the mounts 15. An accelerometer 67 on the foundation provides a reference or feedforward signal to a controller 71 while an accelerometer 73 on the base 63 provides a feedback or residual signal. As in the previous embodiment, the controller energizes the loudspeakers within the mounts so as to minimize the residual vibration transmitted to the equipment 61. The mounts 15 are preferably again oriented with the speaker side toward the source of the vibrations to be cancelled, i.e. on the foundation side.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An active mount for isolating vibrations between a piece of equipment and a foundation supporting that equipment, said mount comprising:

first and second mounting plates adapted for attachment to said equipment and said foundation respectively;

flexible sealing means connecting the peripheries of said first and second plates thereby to contain a volume of pressurized gas therebetween for supporting the weight of said equipment;

within said volume, means defining a chamber having an opening for receiving an acoustic transducer; and an acoustic transducer mounted in said opening for generating oscillatory pressure variations in said pressurized volume between said plates cancelling those variations induced by machinery vibration, the space within said chamber being vented to said volume thereby to equalize the static pressure in said space with that acting on said plates.

2. A mount as set forth in claim 1 wherein said transducer is a loudspeaker.

3. A mount as set forth in claim 1 wherein said sealing means is a bellows.

4. A mount as set forth in claim 3 wherein said bellows is constructed of a rubber-like material.

5. A mount as set forth in claim 1 wherein said sealing means is a rolling bellows.

6. A system for isolating vibrations produced by machinery from a foundation supporting that machinery, said mount comprising:

first and second mounting plates adapted for attachment to said machinery and said foundation respectively;

flexible bellows connecting the peripheries of said first and second plates thereby to contain a volume of pressurized gas therebetween for supporting the weight of said machinery;

within said volume, means defining an otherwise closed chamber having an opening for receiving an acoustic transducer; and an acoustic transducer mounted in said opening for generating oscillatory pressure variations in said pressurized volume between said plates, the space within said chamber being vented to said volume thereby to equalize the static pressure in said space with that acting on said plates;

at least one transducer for sensing vibration at said foundation;

a controller responsive to said sensing transducer for energizing said acoustic transducer to generate oscillatory pressure variations in said volume which cancel those variations induced by machinery vibration over a preselected band of frequencies.

7. A system as set forth in claim 6 wherein said sensing transducer is an accelerometer.

8. A system as set forth in claim 6 further comprising a transducer providing a signal indicating the fundamental frequency of operation of said machinery and wherein said controller is a feedforward controller responsive to said signal.

9. A system as set forth in claim 8 wherein said machinery is rotating and said fundamental frequency indicating transducer is a tachometer.

10. A system for isolating a piece of equipment from vibrations ambient in a foundation supporting that equipment, said mount comprising:

- first and second mounting plates adapted for attachment to said equipment and said foundation respectively;
- flexible bellows connecting the peripheries of said first and second plates thereby to contain a volume of pressurized gas therebetween for supporting the weight of said machinery;
- within said volume, means defining an otherwise closed chamber having an opening for receiving an acoustic transducer; and
- an acoustic transducer mounted in said opening for generating oscillatory pressure variations in said pressurized volume between said plates, the space within said chamber being vented to said volume thereby to equalize the static pressure in said space with that acting on said plates;
- at least one transducer for sensing ambient vibration;
- a controller responsive to said sensing transducer for energizing said acoustic transducer to generate oscillatory pressure variations in said volume which cancel those variations induced by vibration over a preselected band of frequencies.

11. A system for isolating vibrations produced by rotating machinery from a foundation supporting that machinery, said mount comprising:

- a tachometer providing a signal indicative of the speed of rotation of said machinery;
- first and second mounting plates adapted for attachment to said machinery and said foundation respectively;
- flexible sealing means connecting the peripheries of said first and second plates thereby to contain a volume of pressurized gas therebetween for supporting the weight of said machinery;
- within said volume, means defining an otherwise closed chamber having an opening for receiving an acoustic transducer; and
- an acoustic transducer mounted in said opening for generating oscillatory pressure variations in said pressurized volume between said plates, the space within said chamber being vented to said volume thereby to equalize the static pressure in said space with that acting on said plates;
- at least one accelerometer for sensing vibration at said foundation;
- a feedforward controller responsive to said tachometer signal for generating signals for energizing said acoustic transducer to generate oscillatory pressure variations in said volume, said controller being responsive also to said accelerometer for adjusting said energizing signals to cancel the pressure variations induced by machinery vibration over a preselected band of frequencies.

* * * * *